Jan. 27, 1925. 1,524,513
H. J. FERRIS
COASTER WAGON
Filed Dec. 24, 1923
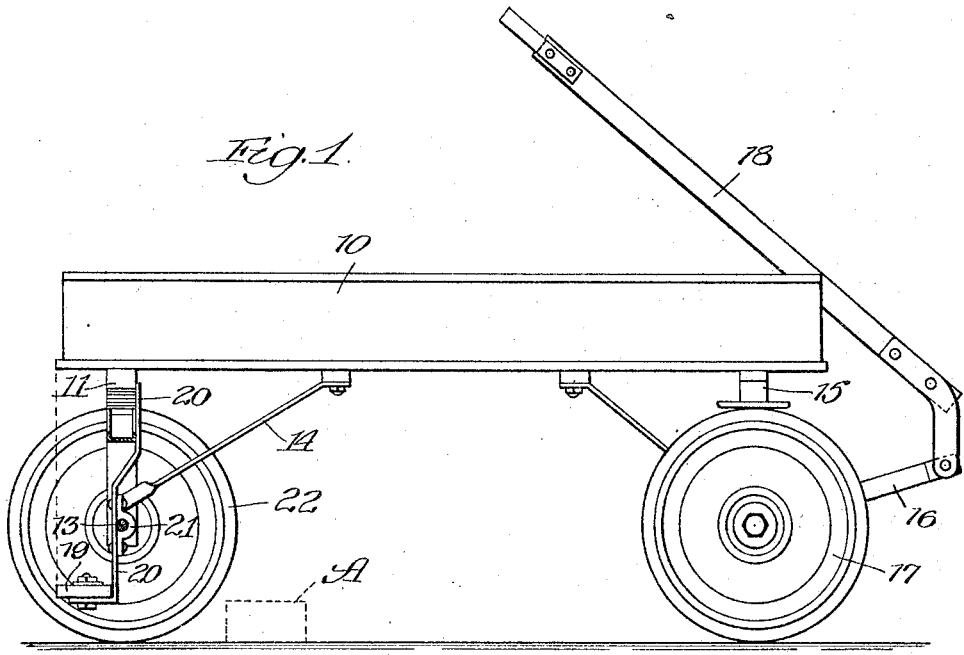
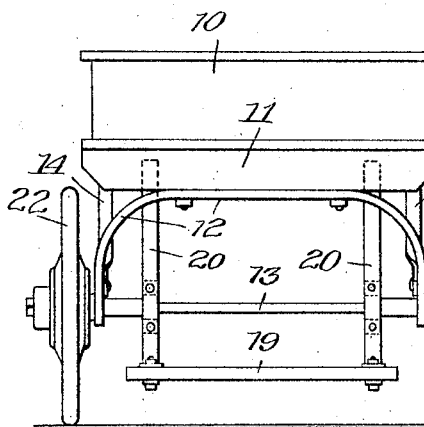
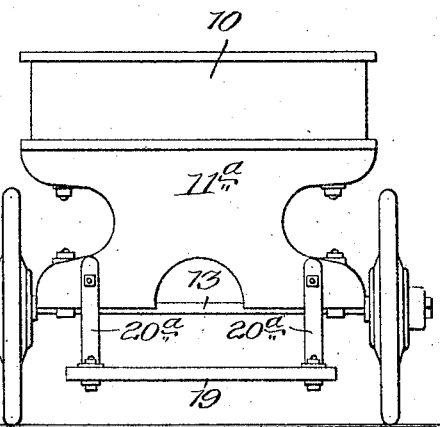
Inventor
Howard J. Ferris,
By Dyrenforth, Lee, Chritton & Wiles
Att'ys Patented Jan. 27, 1925.

1,524,513

UNITED STATES PATENT OFFICE.

HOWARD J. FERRIS, OF HARVARD, ILLINOIS, ASSIGNOR TO HUNT-HELM-FERRIS & COMPANY, OF HARVARD, ILLINOIS, A CORPORATION OF ILLINOIS.

COASTER WAGON.

Application filed December 24, 1923. Serial No. 682,493.

*To all whom it may concern:*

Be it known that I, HOWARD J. FERRIS, a citizen of the United States, residing at Harvard, in the county of McHenry and State of Illinois, have invented a new and useful Improvement in Coaster Wagons, of which the following is a specification.

This invention relates to coaster wagons for children and the like and more particularly to a coaster platform to be used on such wagons. Heretofore a boy in using a coaster wagon has placed one knee in the wagon but this necessitated his one foot hanging over the sharp rear edge of the wagon bottom or bed, while the other rests upon the ground, and for this and other reasons was a source of general dissatisfaction.

In the present invention this difficulty is overcome by placing a platform at the rear of the coaster wagon which is below the rear axle leaving room between the axle and platform for the child's foot and between the rear wheels and so near the rear axle as to be nearly beneath it.

This and other objects are accomplished by this invention which is fully described in the following specification and shown in the accompanying drawing in which:

Figure 1 is a side elevation of a coaster wagon embodying the invention;

Fig. 2 is a rear elevation of the same; and

Fig. 3 is a similar view of a modified form of the device.

The embodiment shown comprises a coaster wagon having a bed 10 to which is attached a rear bolster 11 carrying a depending member 12 to the ends of which is secured a rear axle 13. Braces 14 serve to stiffen and support the member 12.

To the front end of the wagon is secured a front bolster 15 on which is pivotally mounted any well known coaster steering mechanism 16 including a shaft, not shown, on which is journalled the front wheels 17, the whole being steered by means of the steering handle 18 in a well known manner.

At the rear of the rear axle 13 I have provided a coaster platform 19 which is carried by means of vertical supports 20, the latter being journalled on the rear axle 13 by means of straps 21, the upper ends of the supports 20 passing under and resting against the front of the rear bolster 11 as shown in Fig. 1.

This coaster platform is preferably below the level of the rear axle 13 and closely adjacent thereto so that the weight borne upon it by the boy doing the coasting does not have a very great tendency to lift the front wheels of the wagon off the ground. Moreover this platform is placed between the two rear wheels so that there is no tendency whatever to cause the wagon to tilt to either side.

The platform 19 is hingedly mounted so as to permit it to swing up if it strikes an object as a stone which passes between the wheels and immediately swings down again after passing over it.

In Fig. 3 is shown a modified form of the device where the rear bolster 11$^a$ is made in one piece which extends from the bed 10 to the rear axle 13. In this case the supports 20$^a$ are bolted to the rear axle 11$^a$. This platform operates substantially the same as the one previously described except that it is rigidly mounted on the wagon.

It will be noted from Fig. 1 that the coaster platform 19 preferably lies within the space enclosed by the peripheries of the two rear wheels 22 so that there is no tendency for this platform to strike an object as a step or a block A (Fig. 1) over which the rear wheels pass.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. In a coaster wagon, a wagon body including a rear bolster, a rear axle carried thereby, rear wheels on said rear axle, and a platform supported entirely by said rear axle at the rear and between said rear wheels upon which the operator stands with one foot while propelling the wagon with the other foot, said platform being hinged to permit it to swing to the rear on passing over an obstacle.

2. In a coaster wagon, a wagon body including a rear bolster, a rear axle carried thereby, rear wheels on said rear axle, a platform at the rear and between said rear wheels upon which the operator stands with one foot while propelling the wagon with the other foot, said platform being hingedly mounted upon said rear axle to permit it to swing to the rear on passing over an obstacle, and stop means carried by said platform adapted to limit its forward swing.

In witness whereof I have hereunto set my hand and seal this 14 day of December 1923.

HOWARD J. FERRIS.